United States Patent [19]
Mornhed et al.

[11] Patent Number: 5,655,377
[45] Date of Patent: *Aug. 12, 1997

[54] METHOD OF LOW-TEMPERATURE STRATIFIED CHILLED WATER STORAGE

[75] Inventors: Goran Mornhed, Croton on Hudson, N.Y.; John Young, Halifax; Harvey W. Thompson, Mississaugua, both of Canada

[73] Assignee: Trigen Energy Corporation, White Plains, N.Y.

[*] Notice: The term of this patent shall not extend beyond the expiration date of Pat. No. 5,465,585.

[21] Appl. No.: 538,080

[22] Filed: Oct. 2, 1995

Related U.S. Application Data

[63] Continuation-in-part of Ser. No. 260,561, Jun. 16, 1994, Pat. No. 5,465,585.
[51] Int. Cl.$^6$ ..................................................... F25C 5/18
[52] U.S. Cl. ............................................................ 62/59
[58] Field of Search ................................. 62/59; 165/10; 252/67, 70

[56] References Cited

U.S. PATENT DOCUMENTS

| | | | |
|---|---|---|---|
| 4,109,702 | 8/1978 | Greene | 165/10 |
| 4,192,146 | 3/1980 | Crede | 62/59 |
| 4,254,635 | 3/1981 | Simon et al. | 62/59 |
| 4,446,910 | 5/1984 | Miller et al. | 165/10 |
| 4,595,516 | 6/1986 | Wada et al. | 252/70 |
| 4,596,120 | 6/1986 | Knodel et al. | 62/59 |
| 4,821,794 | 4/1989 | Tsai et al. | 62/59 |
| 5,065,598 | 11/1991 | Kurisu et al. | 62/59 |
| 5,348,080 | 9/1994 | Kuroda et al. | 62/59 |

*Primary Examiner*—William E. Tapolcai
*Attorney, Agent, or Firm*—Jay H. Maioli

[57] ABSTRACT

The lower-most temperature of the thermal mass in a chilled water stratified storage tank is lowered without reducing its density by the addition of sodium nitrite and sodium nitrate, alone or in combination, preserving thermal stratification so that both warm and chilled water may be stored in the tank, a benefit not previously obtained without the use of chemicals damaging to the environment. A solution of sodium nitrite and sodium nitrate lowers the freezing point of the cooling water to −13.2° C. (8.3° F.) yet still permits the chilled water to stratify in the storage tank.

21 Claims, 5 Drawing Sheets

METHOD OF LOW-TEMPERATURE STRATIFIED CHILLED WATER STORAGE

CROSS REFERENCE TO RELATED APPLICATION

This application is a continuation in part of our application, U.S. Ser. No. 08/260,561, filed Jun. 16, 1994 and entitled METHOD OF LOW-TEMPERATURE STRATIFIED CHILLED WATER STORAGE), now U.S. Pat. No. 5,465,585.

BACKGROUND OF THE INVENTION

This invention relates generally to a method for thermal energy storage and, particularly, to a method for storing thermal energy using stratified chilled water.

There are a number of air conditioning and process cooling applications in which it is necessary to provide a measure of additional cooling capacity during peak cooling periods. It is also generally necessary to provide for the rejection of heat during these peak cooling periods. These requirements can be met using thermal energy storage.

One application for thermal energy storage might be found in a district cooling system for providing cooling for a large number of buildings from a single source. It is known in such a district cooling system that it is possible to utilize equipment that has less cooling capacity than the peak demand requires by using thermal energy storage. More specifically, the chilling equipment is operated at night during a minimal demand period and chilled water is stored in a large thermal storage tank. Then, when the demand increases during the day the chilled water is drawn off from the tank to improve the ability of the cooling equipment to provide the required cooling. As an example of the scale of such a district cooling system it is possible to use cooling equipment that has a 6,000 ton capacity to meet a cooling requirement of 11,000 tons by using a thermal storage tank holding around three million gallons of water.

Generally, such a thermal storage tank is always full, so that as cooled water is drawn off from the bottom of the tank the warmer water is returned at the top. The range of temperatures in such a tank is typically from 5.5° C. (42° F.) to 15.55° C. (60° F.) and between these temperatures the respective specific gravities of water increases steadily as the temperature drops resulting in gravity separation such as there would be in a conventional hot water tank, for example. Such thermal storage tanks usually have some sort of non-mixing inlet/outlet system so that the cooled outlet water is not mixed with the warm inlet water. Thus, the thermal storage tank will typically have a layer of chilled water at around 5.5° C. (42° F.) at the bottom with a layer of warm water of up to 15.55° C. (60° F.) on top of the chilled water.

Further economic savings and other advantages could be achieved if the temperature of the chilled water could be reduced without decreasing its density. A storage and pipeline system could double its capacity using the same volume of water and the system would be able to serve newer buildings which have 1.11° C. (34° F.) air conditioning systems. This is not possible in a system employing only water as the thermal mass sink, because the maximum density of water occurs at 4.0° C. (39.2° F.). At temperatures below 4.0° C. (39.2° F.) the density starts to decrease so the cooler water will rise and stratified chilled water cannot be maintained because the water mixes and the stratification is destroyed.

One common approach to increasing the ability of the thermal mass sink to accept the rejected heat is to use chilled or refrigerated aqueous solutions of brines, such as calcium chloride, sodium chloride, or glycol, all of which are capable of operating at temperatures below the freezing point of water, 0° C. (32° F.). While these brine solutions or glycol solutions have been used for many years, they each have particular problems which require either expensive or presently unacceptable remedies. For example, brine solutions are corrosive and require the use of a corrosion inhibitor. The most commonly used corrosion inhibitor has been sodium chromate. Today, however, sodium chromate is an environmentally unacceptable chemical and is, therefore, not available for use. On the other hand, industrial ethylene glycol solutions are normally used in the range of 25% and in addition to the prohibitive cost in installations of the size mentioned above also require inhibitors to control corrosion and chemical decomposition. Furthermore, microbiological decomposition of ethylene glycol can occur at solution concentrations below 20%, so that the higher solution concentrations must be used.

OBJECTS AND SUMMARY OF THE INVENTION

Accordingly, it is an object of the present invention to provide a method for storing stratified chilled water that can eliminate the above-noted defects inherent in the previously proposed chemical treatments for thermal energy storage systems and that can provide increased storage capacity.

Another object of this invention is to provide a method of low-temperature stratified chilled water storage in which the freezing point of the water is depressed without destroying the ability to achieve stratification of the different temperature liquids in the thermal storage tank.

There is a further object of the present invention to provide an economically sized, depressed freezing point stratified chilled water system in which chemical solutions are used that are environmentally acceptable and that do not require large amounts of expensive corrosion inhibitors.

In accordance with an aspect of the present invention, a method of achieving low-temperature stratified chilled water storage involves adding aqueous solutions of sodium nitrite and sodium nitrate separately or in combination to the water forming the thermal mass sink being returned in the thermal storage tank. Utilizing sodium nitrite and sodium nitrate alone or in combination in accordance with the present invention depresses the solution freezing point and permits a straight line density temperature curve of the overall system, resulting in stratified storage of the thermal mass at temperatures below 4.4° C. (40° F.) and, more specifically, 4.1° C. (39.4° F.).

Various nitrite/nitrate solution concentrations can be utilized in practicing the present invention. For example, the solution concentrations can range from less than 3% up to 25% and still obtain the thermal savings benefits while remaining economically advantageous.

The above and other objects, features, and advantages of the present invention will become apparent from the following detailed description of illustrative embodiments thereof, to be read in conjunction with the accompanying drawings.

DETAILED DESCRIPTION OF PREFERRED EMBODIMENTS

Figure 1:
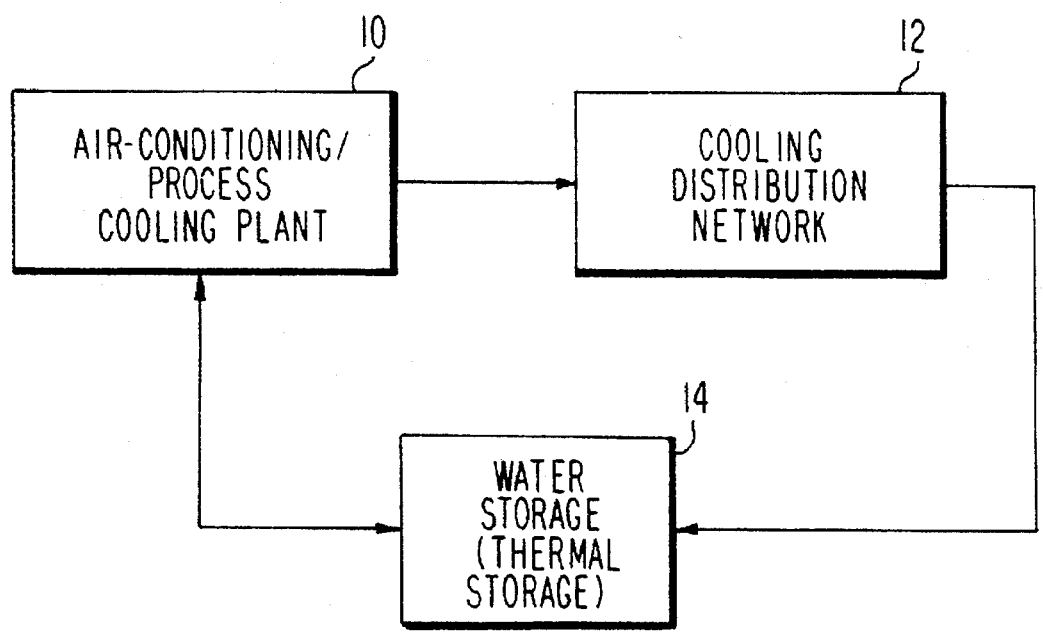
FIG. 1 is a block diagram of an overall cooling system employing thermal energy storage that can benefit by following the present inventive method.

FIG. 1 represents a typical application for air-conditioning or process cooling in which a cooling plant 10 provides the necessary chilled water to a cooling distribution network 12 with the thermal storage being provided by a large water tank 14. The cooling plant 10 may relate to a district air-conditioning system or to a process cooling application and in both cases the thermal storage takes place in the water tank 14. By providing a means of increasing the chilling capacity of the thermal storage without requiring more chilled water 14 it is possible to utilize a smaller capacity cooling plant 10 yet still provide all of the cooling required in the network 12 by operating more constantly over longer periods of time and with higher efficiency during cooler hours.

Figure 2:
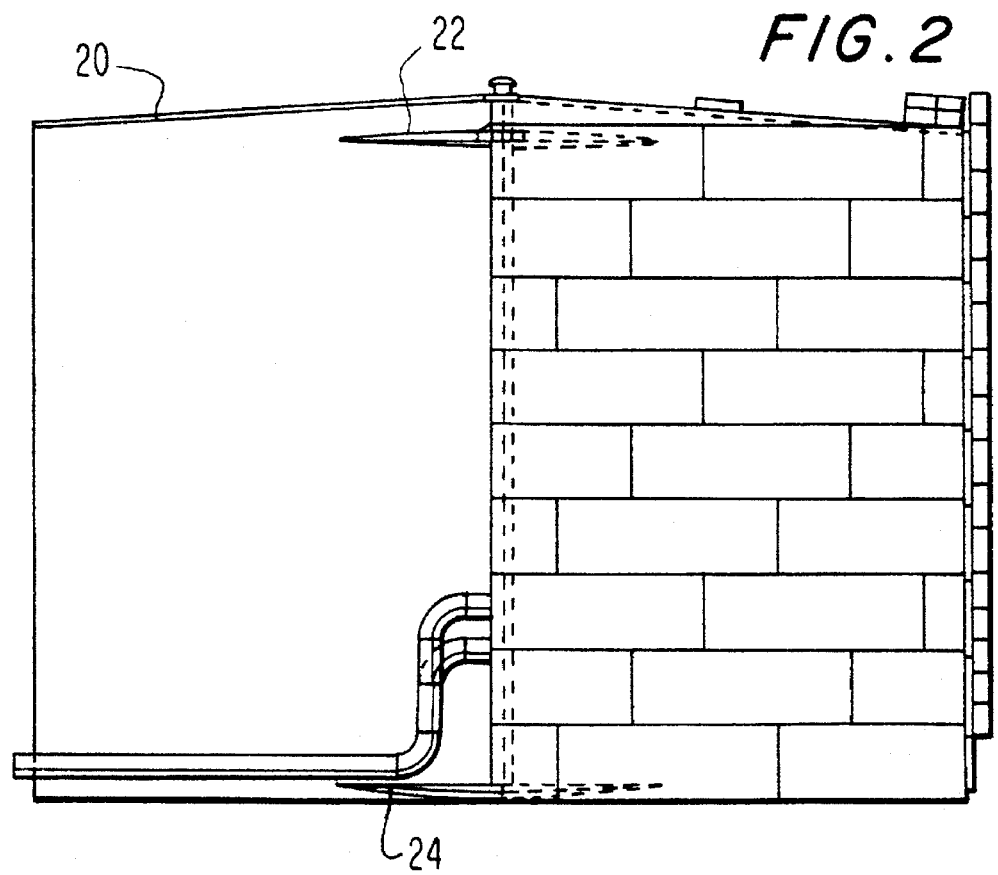
FIG. 2 is an elevational view in partial cross section of a water storage tank used in the system of FIG. 1.

FIG. 2 represents a typical water tank 20 used in a system such as that of FIG. 1. In a large chilled-water cooling system this tank may be as big as 127 feet in diameter and 90 feet high. It is in this large volume of cooling liquid that the stratification must be maintained, so that the storage of both warm and chilled water in the same tank can be accomplished.

As described above, such a storage tank 20 typically has a nonmixing inlet and outlet system to prevent agitation and mixing of the cooled water and warm water as it is introduced into and drawn out of the tank. Such nonmixing can be accomplished using radial diffuser plates at the inlet/outlet at the top and bottom of the tank, shown respectively at 22 and 24. Such nonmixing can also be accomplished using a two-pipe baffle system at each inlet and outlet. In such baffle system two pipes, not shown, are concentrically arranged with the apertures in the pipes being offset relative to each other.

Just as it is necessary to keep the cool water and warm water from mixing, it is also desirable to keep the interface thermocline no more than 12 to 36 inches in thickness. The thermocline is the area of mixed temperature water between the 5.5° C. (42° F.) chilled water and the 15.55° C. (60° F.) return water. It will be understood that any mixing, as represented by a very thick thermocline layer, will reduce the amount of chilled water that can be stored at night for delivery to buildings at the required temperature during the day. This interface layer or band will move up and down in the tank as chilled water is taken from or added to the tank.

Figure 4:
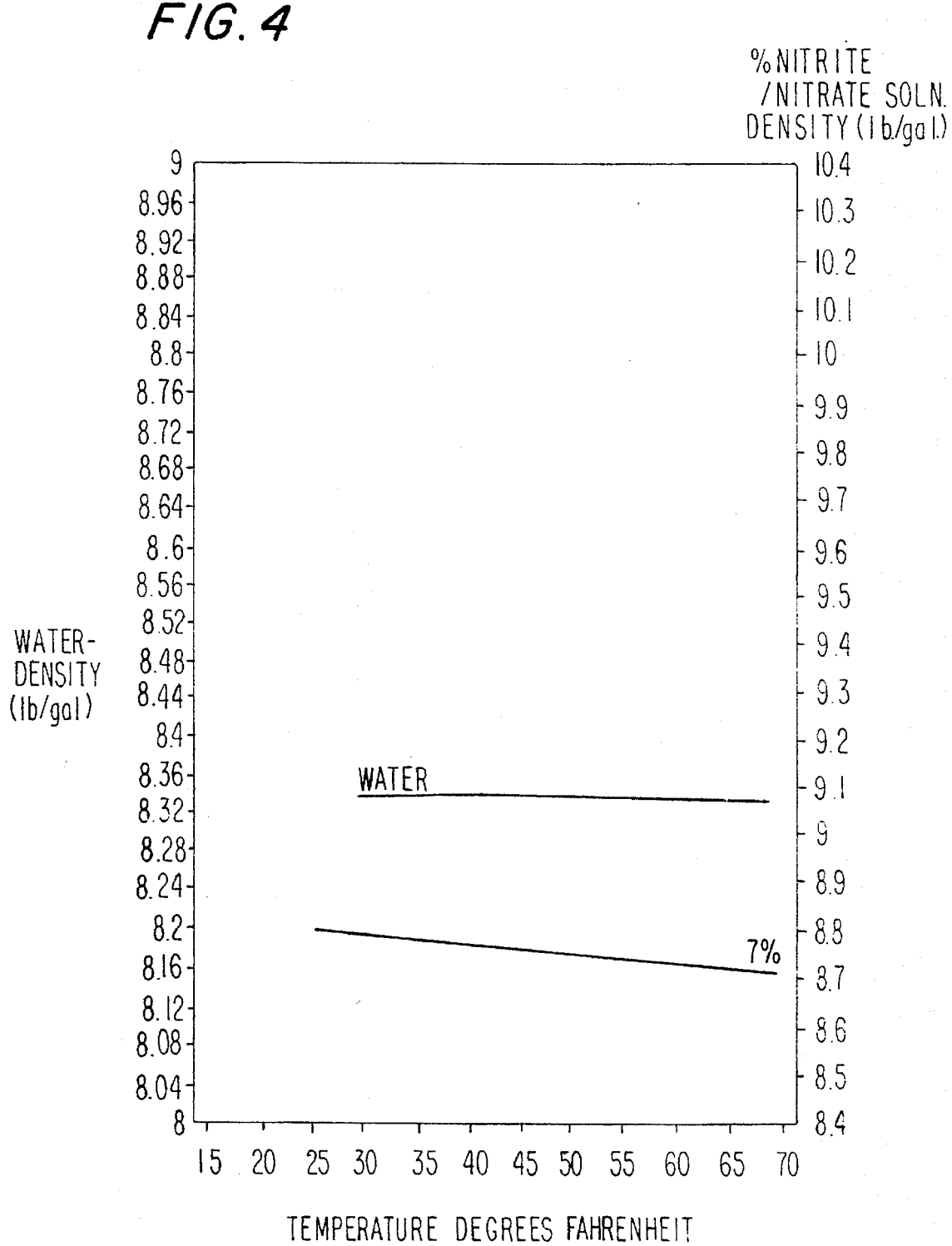
FIG. 4 is a graph showing a straight line temperature versus density curve for a 7% nitrite/nitrate solution provided in accordance with an embodiment of the present invention.

Maintaining this stratification is an important feature of the present invention and relates to the separation of liquids at different densities in a container when not exposed to turbulence or mixing due to fluid flow. The present invention teaches to take steps to change the density of the solution in proportion to the temperature change. Referring to FIG. 4, it is seen that the colder the solution, the higher the density. For example, assume that the tank 20 is full of solution at 12.22° C. (54° F.) with a density of 8.75 lbs/gal and chilled solution is introduced through inlet diffuser 24 at −1.11° C. (30° F.) with a density of 8.78 lbs/gal. The −1.11° C. (30° F.) solution will form a layer at the bottom of the tank 20 and will remain separated indefinitely from the 12.22° C. (54° F.) solution, so long as there is no change in solution layer temperature. The above-described interface band or thermocline will exist between the two solution layers.

According to the present invention, the addition of sodium nitrite and sodium nitrate alone or in combination will permit stratified storage of the thermal mass below the 4.4° C. (40.0° F.) limit permitted when utilizing water alone. In one embodiment, a 7% solution of sodium nitrite and sodium nitrate in a 2 to 1 ratio is provided, however, the solution concentration can range from below 3% to at least 25%. In three other embodiments, 3%, 15% and 25% solutions of sodium nitrite and sodium nitrate in a 2 to 1 ratio are provided.

The use of the sodium nitrite/sodium nitrate solution permits storage of the chilled solution at lower temperatures than with only water. For example, the minimum temperature at which pure water can be stored in a stratification mode is 3.88° C. (39° F.). At temperatures between 39° F. and the freezing point of 0° C. (32° F.) the density of water decreases, thus water colder than 3.88° C. (39° F.) will rise in the tank and the desired stratification will not take place.

Although microbiological growth and degradation of sodium nitrite frequently occur in low level concentrations, the present invention teaches that even when using concentrations for thermal storage of less than 5%, but not less than 3%, microbiological growth does not occur at these concentrations and, in fact, the solution has been found to be microbicidal.

A further advantage in utilizing sodium nitrite to lower the temperature of the chilled water is that sodium nitrite is readily oxidized to nitrate, either biologically or by chlorination. This means that such nitrate can be removed from the waste water by natural biological action or by aquatic vegetation.

Figure 3:
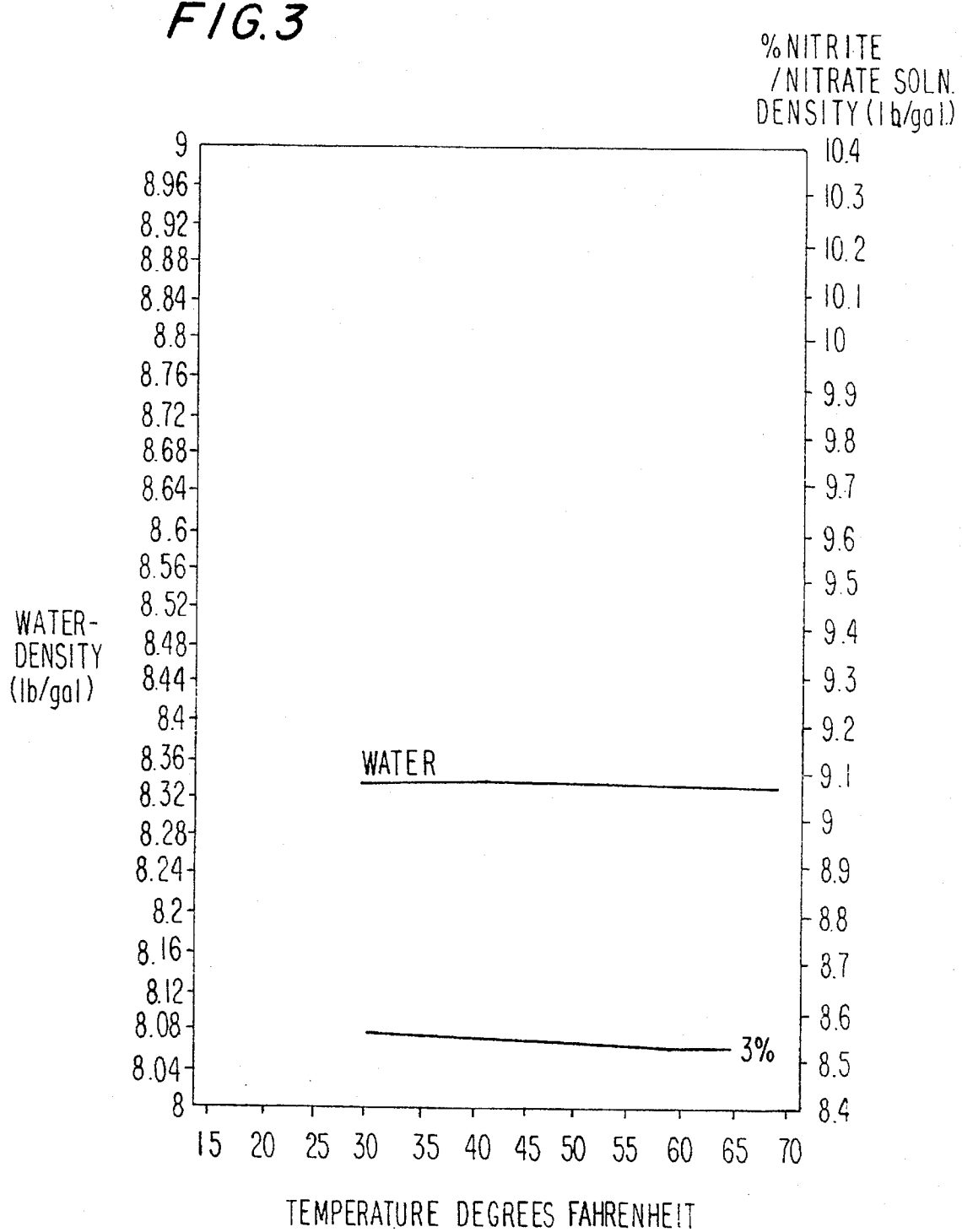
FIG. 3 is a graph showing a straight line temperature versus density curve for a 3% nitrite/nitrate solution provided in accordance with an embodiment of the present invention.
Figure 5:
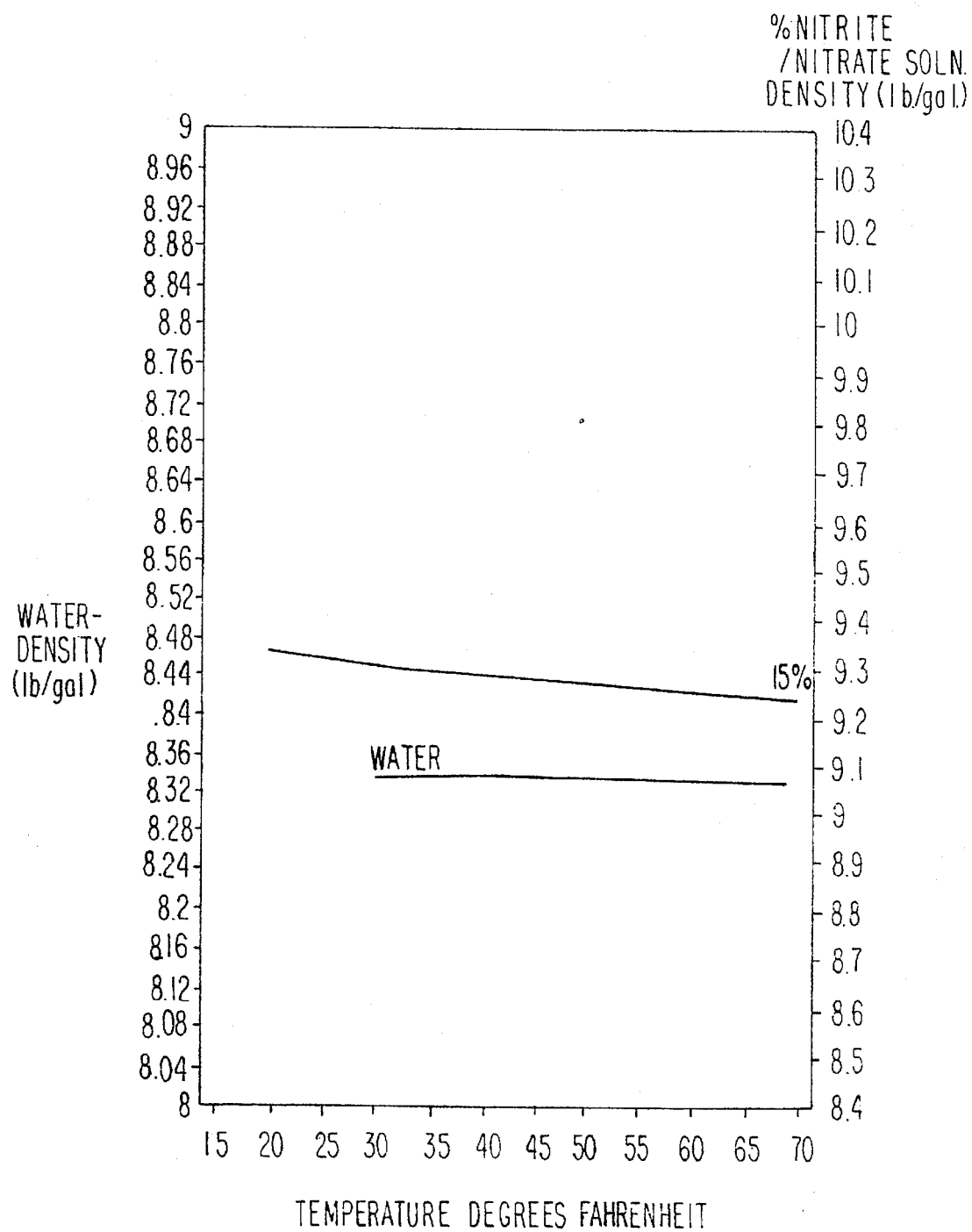
FIG. 5 is a graph showing a straight line temperature versus density curve for a 15% nitrite/nitrate solution provided in accordance with an embodiment of the present invention.
Figure 6:
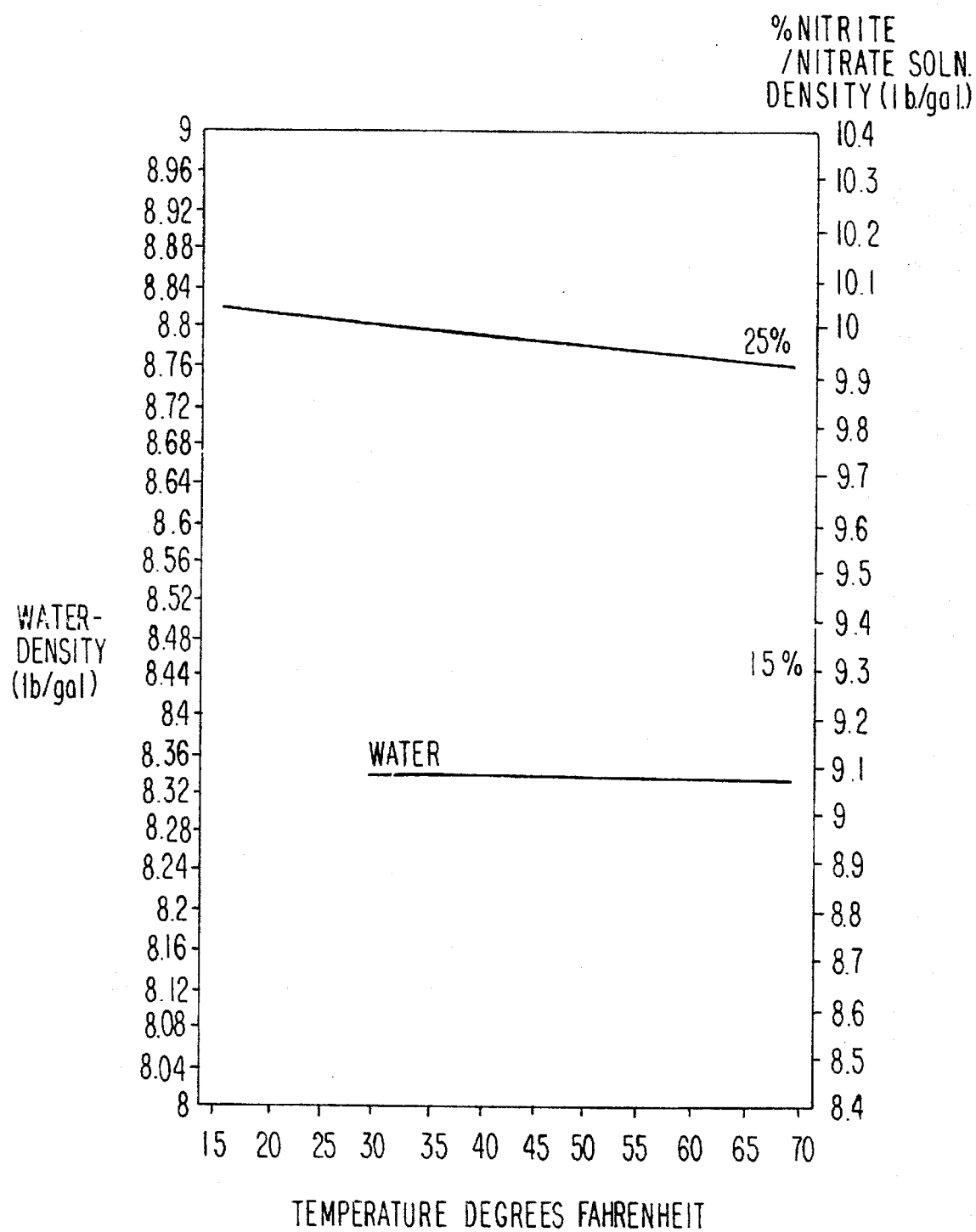
FIG. 6 is a graph showing a straight line temperature versus density curve for a 25% nitrite/nitrate solution provided in accordance with an embodiment of the present invention.

The present invention teaches to depress the freezing point of the solution to permit cooling below 0° C. (32° F.) and also to produce a temperature/density gradient to allow the production of a stratified thermal mass. FIG. 3 represents a straight line temperature/density curve attainable in keeping with the present invention by using a 3% sodium nitrite/sodium nitrate solution in a 2 to 1 ratio. FIG. 4 represents a straight line temperature/density curve attainable in keeping with the present invention by using a 7% sodium nitrite/sodium nitrate solution in a 2 to 1 ratio. FIG. 5 represents a straight line temperature/density curve attainable in keeping with the present invention by using a 15% sodium nitrite/sodium nitrate solution in a 2 to 1 ratio. FIG. 6 represents a straight line temperature/density curve attainable in keeping with the present invention by using a 25% sodium nitrite/nitrate solution in a 2 to 1 ratio.

Similar results are attainable using other salts of nitrite and nitrate, as well as salts of chloride and sulphates. Similarly, potassium and lithium nitrite/nitrate salts produce solutions with suitable physical properties with respect to lowering the freezing point and density, however, they are more expensive than the sodium salts.

A further advantage obtained by using sodium nitrite/sodium nitrate according to the present invention is the provision of corrosion inhibition for the metals employed in the cooling system. Although chloride and sulphate salts might be generally less expensive than sodium nitrite/ sodium nitrate, they are corrosive and require the addition of corrosion inhibitors. As a further problem with those other salts, the most effective and only commercially available chloride corrosion inhibitor is chromate, however, because of environmental restrictions chromate can not be used.

An example of the use of the above-described invention in the application of a commercially available product containing sodium nitrite and sodium nitrate, in approximately a 2 to 1 ratio, in a large chilled water storage system is set forth below.

EXAMPLE 1—3%

The thermal storage operates at a chilled water temperature of −1.1° C. (30° F.) and in order to provide freeze protection in the system and equipment, a solution strength of 3% sodium nitrite and sodium nitrate in a 2 to 1 ratio was prepared that has a freezing point of −1.6° (29.2° F.). This results in an approximate straight line temperature density curve over the system operating temperature range of −1.1° C. (30° F.) to 13.3° C. (56° F.). Tests relating to the use of a corrosion coupon and the linear polarization resistance technique showed the 7% solution was not only non-corrosive to mild steel but also creates corrosion inhibitors, and is only moderately corrosive to copper and copper alloys. In this example, a 5.5 ppm of tolyltriazole was added and this sharply decreased the corrosion rate for copper and brass.

EXAMPLE 2—7%

The thermal storage operates at a chilled water temperature of −1.1° C. (30° F.) and in order to provide freeze protection in the system and equipment, a solution strength of 7% sodium nitrite and sodium nitrate in a 2 to 1 ratio was prepared that has a freezing point of −3.75° C. (25.25° F.). This results in an approximate straight line temperature density curve over the system operating temperature range of −1.1° C. (30° F.) to 13.3° C. (56° F.).

Tests relating to the use of a corrosion coupon and the linear polarization resistance technique showed the 7% solution was not only non-corrosive to mild steel but also creates corrosion inhibitors, and is only moderately corrosive to copper and copper alloys. In this example, a 5.5 ppm of tolyltriazole was added and this sharply decreased the corrosion rate for copper and brass.

EXAMPLE 3—15%

The thermal storage operates at a chilled water temperature of −1.1° C. (30° F.) and in order to provide freeze protection in the system and equipment, a solution strength of 15% sodium nitrite and sodium nitrate in a 2 to 1 ratio was prepared that has a freezing point of −7.5° C. (18.5° F.). This results in an approximate straight line temperature density curve over the system operating temperature range of −1.1° C. (30° F.) to 13.3° C. (56° F.).

Tests relating to the use of a corrosion coupon and the linear polarization resistance technique showed the 7% solution was not only non-corrosive to mild steel but also creates corrosion inhibitors, and is only moderately corrosive to copper and copper alloys. In this example, a 5.5 ppm of tolyltriazole was added and this sharply decreased the corrosion rate for copper and brass.

EXAMPLE 4—25%

The thermal storage operates at a chilled water temperature of −1.1° C. (30° F.) and in order to provide freeze protection in the system and equipment, a solution strength of 25% sodium nitrite and sodium nitrate in a 2 to 1 ratio was prepared that has a freezing point of −13.2° C. (8.3° F.). This results in an approximate straight line temperature density curve over the system operating temperature range of −1.1° C. (30° F.) to 13.3° C. (56° F.).

Tests relating to the use of a corrosion coupon and the linear polarization resistance technique showed the 7% solution was not only non-corrosive to mild steel but also creates corrosion inhibitors, and is only moderately corrosive to copper and copper alloys. In this example, a 5.5 ppm of tolyltriazole was added and this sharply decreased the corrosion rate for copper and brass.

The solutions of the sodium nitrite and sodium nitrate mentioned above were tested for microbial activity using an inoculation procedure on the test solution and a control sample of tap water. The results showed that the nitrite/nitrate solutions of 3% concentration or more are inhibitory or microbicidal to microbiological growth. At concentrations of less than 3%, the nitrite/nitrate solutions are no longer microbicidal.

Further tests were made to determine the corrosion effect of the nitrite/nitrate solution at the air solution interface inside the steel thermal storage tank, such as represented in FIG. 2. The test results revealed that corrosion at the interface and in the vapor phase is negligible or nonexistent, thereby eliminating the requirement for protective coatings.

It is understood of course that the foregoing is presented by way of example only and is not intended to limit the scope of the invention, which is to be defined solely by the appended claims.

What is claimed is:

1. A method of low-temperature stratified chilled water storage in a thermal storage tank, comprising steps of:
    preparing a sodium nitrite and water solution;
    storing the prepared solution in a storage tank;
    chilling a portion of the stored, prepared solution to a temperature below 4.1° C. (39.4° F.); and
    introducing the chilled solution at the bottom of the storage tank,
whereby the tank contains a layer of the chilled solution at a temperature below 4.1° C. (39.4° F.) located below a layer of the prepared solution at a temperature above 4.1 C. (39.4 F.).

2. The method according to claim 1, wherein the step of introducing includes preventing mixing between the chilled solution being introduced and the solution already stored in the tank.

3. The method according to claim 1, wherein the step of preparing includes adding 5.5 ppm of tolyltriazole.

4. The method according to claim 1, wherein a 3%–25% solution of sodium nitrite and water is prepared.

5. The method according to claim 4, wherein the step of preparing includes adding 5.5 ppm tolyltriazole.

6. A method of low-temperature stratified chilled water storage in a thermal storage tank, comprising steps of:
    preparing a sodium nitrate and water solution;
    storing the prepared solution in a storage tank;
    chilling a portion of the stored, prepared solution to a temperature below 4.1° C. (39.4° F.); and
    introducing the chilled solution at the bottom of the storage tank,
whereby the tank contains a layer of the chilled solution at a temperature below 4.1° C. (39.4° F.) located below a layer of the prepared solution at a temperature above 4.1° C. (39.4° F.).

7. The method according to claim 6, wherein the step of introducing includes preventing mixing between the chilled solution being introduced and the solution already stored in the tank.

8. The method according to claim 6, wherein a 3%–25% solution of sodium nitrate and water is prepared.

9. The method according to claim 6, wherein the step of preparing includes adding 5.5 ppm of tolyltriazole.

10. The method according to claim 8, wherein the step of preparing includes adding 5.5 ppm of tolyltriazole.

11. A method of low-temperature stratified chilled water storage in a thermal storage tank, comprising steps of:

preparing a sodium nitrite, sodium nitrate and water solution;

storing the prepared solution in a storage tank;

chilling a portion of the stored, prepared solution to a temperature below 4.1° C. (39.4° F.); and introducing the chilled solution at the bottom of the storage tank, whereby the tank contains a layer of the chilled solution at a temperature below 4.1° C. (39.4° F.) located below a layer of the prepared solution at a temperature above 4.1° C. (39.4° F.).

12. The method according to claim 11, wherein the step of introducing includes preventing mixing between the chilled solution being introduced and the solution already stored in the tank.

13. The method according to claim 11, wherein the step of preparing includes the step adding the sodium nitrite and sodium nitrate to the water in a 2 to 1 ratio.

14. The method according to claim 11, wherein the step of preparing includes adding 5.5 ppm of tolyltriazole.

15. The method according to claim 11, wherein a 3%–25% solution of sodium nitrite, sodium nitrate and water is prepared.

16. The method according to claim 15, wherein the step of preparing includes the step of adding the sodium nitrite and sodium nitrate to the water in a 2:1 ratio.

17. The method according to claim 15, wherein the step of preparing includes adding 5.5 ppm of tolyltriazole.

18. The method according to claim 15, wherein the step of introducing includes preventing mixing between the chilled solution being introduced and the solution already stored in the tank.

19. The method according to claim 15, wherein a 3% solution of sodium nitrite, sodium nitrate and water is prepared.

20. The method according to claim 15, wherein a 15% solution of sodium nitrite, sodium nitrate and water is prepared.

21. The method according to claim 15, wherein a 25% solution of sodium nitrite, sodium nitrate and water is prepared.

* * * * *